June 29, 1965 G. P. McCORD 3,191,655
MOLDED ARTICLE, ESPECIALLY A TUBELESS TIRE VALVE STEM ASSEMBLY
Filed March 21, 1963

INVENTOR.
GEORGIE P. McCORD
BY
Robert J. Patterson
ATTORNEY.

United States Patent Office 3,191,655
Patented June 29, 1965

3,191,655
MOLDED ARTICLE, ESPECIALLY A TUBELESS
TIRE VALVE STEM ASSEMBLY
Georgie P. McCord, Oaklandon, Ind., assignor to United
States Rubber Company, New York, N.Y., a corporation of New Jersey
Filed Mar. 21, 1963, Ser. No. 266,922
6 Claims. (Cl. 152—427)

This invention relates to an article of manufacture wherein a fluid-tight seal is provided between two rigid components through compression of an elastomeric component between the two rigid members. Potential applications of my invention are fluid-tight closures and valves. More particularly, my invention relates to a valve stem assembly for a tubeless tire and rim.

The principal object of my invention is to provide a new and improved article having a fluid-tight seal between two rigid members and a novel method of obtaining such an article. Another object is to provide an improved tubeless tire valve. Another object is to achieve the foregoing objects using conventional molding equipment and in particular, an injection molding process. Numerous other objects will appear hereinafter.

In one broad aspect, my invention is an article of manufacture comprising a first rigid component, a second rigid component, one of said rigid components being composed of solid plastic, one of said rigid components surrounding the other, and an elastomeric component disposed between the rigid components and being compressed tightly therebetween and forming a fluid-tight seal between the two rigid components.

In practicing my invention, compression of the rubber component to form the fluid-tight seal is obtained by using the rubber component and one of the rigid components as inserts in a plastic injection mold and applying the other rigid component as a plastic component by injection molding.

The use of rigid inserts in injection molding of plastic articles is commonplace, but the use of elastic as opposed to rigid inserts is to the best of my knowledge novel and in particular, the injection of a plastic to compress an elastic insert and thereby effect a fluid-tight seal between two rigid inserts is novel. The end use of the article employing my fluid-tight seal will dictate the choice of materials. Thus, the rubber part may have to be compounded for oil- or weather-resistance, non-toxicity or for any number of other qualifications. Any elastomer, which is deformable under compression but is resilient so that it will rapidly resume its original shape upon removal of the deforming force, is a prospective material. Examples of rubbers which can be used are: SBR, butyl, butadiene-acrylonitrile rubber (so called Buna N or nitrile rubber), neoprene, natural rubber, cis-1,4-polybutadiene, synthetic cis-polyisoprene, ethylene-propylene rubber, ethylene-propylene-diene rubber, etc. The rigid component that is injection molded to complete the fluid-tight seal must of necessity be a plastic material. The first consideration is that it must be a material that will not yield (or flow) under the compression force exerted by the rubber component in the finished article and thereby fail to maintain a fluid-tight seal. In addition it is selected to have properties adapted to the environment in which it will be used.

I will now describe my invention with particular reference to the fabrication of a tubeless tire valve.

Tubeless tire valve stem assemblies have been fabricated from rubber and plastic components in an effort to achieve manufacturing economies. Such a valve stem assembly has been disclosed in my U.S. Patent No. 3,032,091. These valves achieve economies not only by utilizing inexpensive materials, but also by eliminating the costly machining necessary with the use of conventional metal parts.

In one specific application, the instant invention provides a tubeless tire valve assembly comprising a resilient rubber sealing member having an outside diameter greater than the diameter of the valve stem opening in the rim, the inner end of the rubber member being inserted in the opening so that the rubber is compressed into sealing engagement therewith. The inner end of the rubber member is defined herein as that end extending into the air chamber defined by the rim, the outer end being that which is exposed. The rubber member has an axially-extending cylindrical recess passing therethrough and is also provided with at least one protruding element on the exterior surface of its outer end.

A rigid tubular member, which may be of plastic, is disposed within this cylindrical recess, the tubular member itself being adapted to receive a valve core therein. The tubular member is also provided with a protruding element on its exterior surface adjacent the outer end of the rubber member. In use a valve core is disposed in the outer end of the tubular member.

Finally, a molded plastic sleeve surrounds both the rubber member and the tubular member, the interior surface of the sleeve conforming to the protruding elements on the exterior surfaces of the rubber member and the tubular member. Thus, the sleeve locks the two members together in fluid-tight relationship.

Conveniently, the protruding element on the exterior surface of the rubber member may desirably comprise a circumferentially extending rib. Likewise, the protruding element on the exterior surface of the tubular member may desirably comprise a circumferentially extending projecting flange. This flange is adapted to seat itself on the outer end of the rubber member.

The invention will be further understood by referring to the following description, when read in conjunction with the accompanying drawings, wherein.

Figure 1:
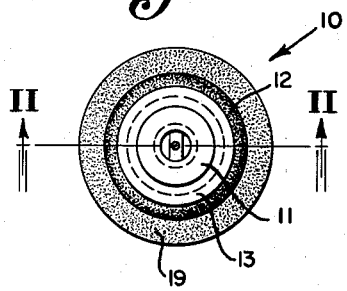
FIG. 1 is an enlarged plan view of the valve stem assembly of the instant invention.
Figure 2:
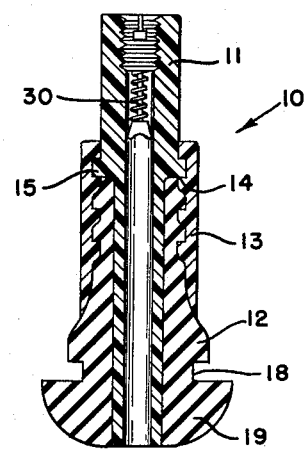
FIG. 2 is a cross-sectional view taken on line 2—2 of FIG. 1.
Figure 3:
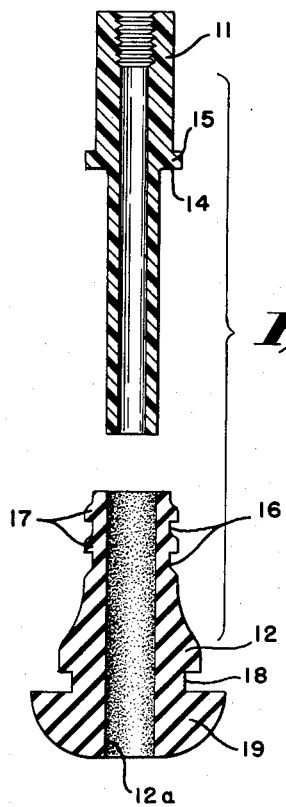
FIG. 3 is an exploded cross-sectional view of the resilient rubber sealing member and the rigid plastic tubular member.

Referring to the drawings and in particular to FIGS. 1, 2 and 3, the valve of the instant invention, generally designated by reference 10, is comprised of a resilient rubber sealing member 12 assembled with a rigid plastic inner tubular member 11 and locked together by means of a molded plastic sleeve 13.

The resilient rubber sealing member 12 can be conveniently made by standard compression molding methods and is provided with an outside diameter greater than the diameter of the opening in the tubeless tire rim. Thus, a conventional rim engaging groove 18 and dome 19 constitute the rim sealing portion of valve 10. Rubber member 12 is molded with an axially extending cylindrical recess 12a therethrough and is also equipped with a series of alternate circumferential grooves 16 and ribs 17, to facilitate the locking of members 11 and 12 together. The type of rubber stock used in rubber member 12 is not limited by the particular valve design, but rather is dictated by the end use of the valve.

The plastic tubular member 11 shown in detail in FIG. 3 is conveniently made by standard injection molding methods. The choice of plastic is not particularly limited other than by the consideration of physical properties. Thermoplastics such as nylon or thermosetting plastics such as Bakelite (a phenol-formaldehyde resin) may be used. Tubular member 11 is provided with a seat 14 for engagement with rubber member 12. Member 11 is also provided with a circumferentially extending projecting flange 15, which acts as a locking means during final assembly. Tubular member 11 is disposed in cylindrical recess 12a of rubber member 12, as shown in FIG. 2.

Tubular member 11 is adapted to receive an air retaining element, such as the valve core 30 shown in FIG. 2. However, it should be understood that the type of valve core disclosed is not the only such air retaining element capable of being used in the assembly. Other types of valves, such as the one disclosed in the aforementioned Patent No. 3,032,091, may also be used.

As shown in FIG. 2, the rubber member 12 and tubular member 11 are locked together in fluid-tight relationship by a molded plastic sleeve 13. Sleeve 13 surrounds rubber member 12 and tubular member 11 as shown. The interior surface of sleeve 13 conforms to the protruding elements on the exterior surfaces of the other members.

Figure 4:
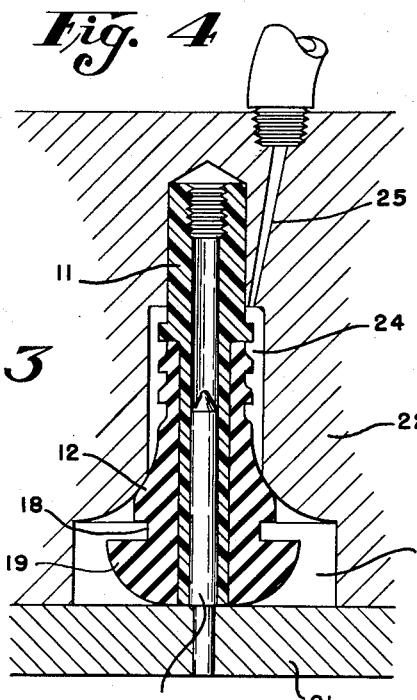
FIG. 4 is a cross-sectional view showing the rubber member and the tubular member assembled in a mold cavity preparatory to injecting plastic material into the cavity portion of the mold to lock the members together.

The valve is made by assembling members 11 and 12 so that tubular member 11 is received within cylindrical recess 12a of rubber member 12 until seat 14 comes into engagement with member 12. The assembly is then placed on a pin 20 on a mold plate 21. As shown in FIG. 4, an upper mold 22, having a preformed cavity 23, is then clamped in place and plastic material is injected into the cavity portion 24 through sprue 25, thus to form sleeve 13. The injection pressure, relative to the plastic material being injected, creates a compressive force on rubber member 12, thereby sealing members 11 and 12 in air-tight engagement.

The selection of suitable materials for the two rigid inserts and for the elastomeric insert and of suitable methods of fabricating each of these three elements including the determination of mold design, of a method of locating members 11 and 12 in the mold, and of injection pressure and temperature for the injection molding step will be obvious to those skilled in the art from this description.

The instant invention results in reduced costs because of the substitution of plastic materials for metals. Also, the cost of injection molding of plastic is less than the cost of machining metal. Finally, the method of assembling the valve is cheaper than that of the conventional valve with a metal insert, inasmuch as no chemical preparation of the metal is required in order to insure a proper metal to rubber bond.

While a particular embodiment of the invention has been shown and described, it is to be understood that this is for the purpose of illustration only and that changes and modifications can be made therein without departing from the spirit and scope of the invention.

The method described herein is the subject of my copending divisional application Serial No. 309,930, filed September 19, 1963.

Having thus described my invention, what I claim and desire to protect by Letters Patent is:

1. An article of manufacture comprising
a first rigid component,
a second rigid component,
one of said rigid components being composed of solid plastic,
one of said rigid components surrounding the other, and
an elastomeric component disposed between said rigid components, said rigid plastic component being molded in assembly with the other two named components and thereby in set condition maintaining said elastomeric component tightly compressed between said rigid components and forming a fluid-tight seal between said rigid components.

2. In combination, a rim having a valve stem opening therethrough and a valve assembly in said opening, said valve assembly comprising
a resilient rubber sealing member having
an outside diameter greater than the diameter of said opening in said rim,
said rubber member being inserted in said opening so that the rubber is in sealing engagement therewith,
the inner end of said rubber member extending into the air chamber defined by said rim,
said rubber member having an axially extending cylindrical recess passing therethrough,
said rubber member being provided with at least one protruding element on the exterior surface of its outer end;
a rigid tubular member received in said cylindrical recess,
said tubular member being adapted to receive a valve core therein,
said tubular member being provided with a protruding element on its exterior surface adjacent the outer end of said rubber member;
a valve core received in the outer end of said tubular member; and a molded rigid plastic sleeve surrounding said rubber member and said tubular member,
the interior surface of said sleeve conforming to the exposed portions of the exterior surfaces of of said rubber member and said tubular member, said rigid plastic sleeve being molded in assembly with said rubber member and said tubular member and thereby in set condition maintaining said rubber member tightly compressed between said tubular member and said rigid plastic sleeve and forming a fluid-tight seal between said tubular member and said rigid plastic sleeve.

3. The combination of claim 2, in which said protruding element on said exterior surface of said rubber member comprises a circumferentially extending rib.

4. The combination of claim 2, in which said protruding element on said exterior surface of said tubular member comprises a circumferentially extending projecting flange.

5. The combination of claim 4, in which said flange is adapted to seat itself on said outer end of said rubber member.

6. A tubeless tire valve assembly adapted to be mounted in a fluid-tight manner in a conventional valve opening in a rim, said assembly comprising
a resilient rubber sealing member having
an outside diameter greater than the diameter of the opening in the rim,
said rubber member being adapted to be inserted in said opening so that the rubber is in sealing engagement therewith,
the inner end of said rubber member being adapted to extend into the air chamber defined by the rim,
said rubber member having an axially extending cylindrical recess passing therethrough,
said rubber member being provided with at least one protruding element on the exterior surface of its outer end;
a rigid tubular member received in said cylindrical recess,
said tubular member being adapted to receive a valve core therein,
said tubular member being provided with a protruding element on its exterior surface adjacent the outer end of said rubber member;
and a molded rigid plastic sleeve surrounding said rubber member and said tubular member,
the interior surface of said sleeve conforming to the exposed portions of the exterior surfaces of said rubber member and said tubular member, said rigid plastic sleeve being molded in assembly with said rubber member and said tubular member and thereby in set condition maintaining said rubber member tightly compressed between said tubular member and said rigid plastic sleeve and forming a fluid-tight seal between said tubular member and said rigid plastic sleeve.

References Cited by the Examiner
UNITED STATES PATENTS

| | | | |
|---|---|---|---|
| 2,763,032 | 9/56 | Fay | 18—59 |
| 2,928,447 | 3/60 | Hosking | 152—427 |
| 2,928,448 | 3/60 | Hosking | 152—427 |
| 2,934,792 | 5/60 | Harrington | 18—59 |
| 2,962,073 | 11/60 | Reed | 152—427 |

ARTHUR L. LA POINT, *Primary Examiner.*